(12) United States Patent
De With et al.

(10) Patent No.: US 6,385,247 B1
(45) Date of Patent: May 7, 2002

(54) ENCODING CIRCUIT FOR TRANSFORM CODING OF A PICTURE SIGNAL AND DECODING CIRCUIT FOR DECODING SAID SIGNAL

(75) Inventors: Peter H. N. De With; Stephanus M. C. Borgers, both of Eindhoven (NL)

(73) Assignee: US Philips Corporation, New York, NY (US)

(*) Notice: Subject to any disclaimer, the term of this patent is extended or adjusted under 35 U.S.C. 154(b) by 0 days.

(21) Appl. No.: 09/634,730

(22) Filed: Aug. 3, 2000

Related U.S. Application Data

(63) Continuation of application No. 08/299,026, filed on Aug. 31, 1994, now abandoned, which is a continuation of application No. 08/171,377, filed on Dec. 21, 1993, now abandoned, which is a continuation of application No. 07/831,597, filed on Feb. 5, 1992, now abandoned.

(30) Foreign Application Priority Data

Feb. 11, 1991 (NL) ............................................. 9100234

(51) Int. Cl.[7] ................................................. H04N 7/30
(52) U.S. Cl. .................................................. 375/240.2
(58) Field of Search .......... 375/240.01, 204.12–240.16, 375/240.18, 240.2, 240.24, 240.25; 382/232, 236, 238, 248, 250; 348/400.1, 415.1; H04N 7/30

(56) References Cited

U.S. PATENT DOCUMENTS

| | | | | |
|---|---|---|---|---|
| 4,707,738 A | * | 11/1987 | Ferre et al. ............... | 348/400.1 |
| 4,754,336 A | * | 6/1988 | Nishizawa ................ | 348/415.1 |
| 4,849,812 A | | 7/1989 | Borgers et al. ............ | 358/133 |
| 4,887,156 A | * | 12/1989 | Ohki ........................ | 348/400.1 |
| 4,894,713 A | * | 1/1990 | Delogne et al. .......... | 375/240.2 |
| 4,901,075 A | | 2/1990 | Vogel ........................... | 341/63 |
| 5,008,748 A | * | 4/1991 | Carr et al. .............. | 375/240.12 |
| 5,091,782 A | * | 2/1992 | Krause et al. .......... | 375/240.16 |
| 5,107,345 A | * | 4/1992 | Lee ........................... | 375/240.2 |
| 5,196,933 A | * | 3/1993 | Henot ...................... | 375/240.2 |
| 5,374,958 A | * | 12/1994 | Yanagihara ............ | 375/240.24 |
| 5,635,985 A | * | 6/1997 | Boyce et al. ........... | 375/240.15 |
| 5,748,244 A | * | 5/1998 | Jung ...................... | 375/240.18 |
| 5,754,232 A | * | 5/1998 | Kim et al. .............. | 375/240.25 |
| 5,767,908 A | * | 6/1998 | Choi ........................ | 375/240.2 |
| 5,767,910 A | * | 6/1998 | Iizuka ...................... | 375/240.2 |
| 5,926,573 A | * | 7/1999 | Kim et al. .............. | 375/240.16 |

FOREIGN PATENT DOCUMENTS

| | | | | |
|---|---|---|---|---|
| EP | | 260748 A2 | 3/1988 | ............ H03M/7/42 |
| EP | | 282135 A1 | 9/1988 | .......... H04N/7/133 |
| EP | | 499307 | * | 8/1992 | |

* cited by examiner

Primary Examiner—Richard Lee
(74) Attorney, Agent, or Firm—Edward W. Goodman

(57) ABSTRACT

An encoding circuit transforms a picture signal into blocks of, for example, 8*8 coefficients, in which each block of coefficients is read motion- adaptively. In the case of motion within a sub-picture, the block of coefficients is read in such an order that the obtained series of coefficients includes, as it were, two interleaved sub-series. The first series starts with a do component, In a first embodiment, the second series starts with the most relevant motion coefficient. In a second embodiment, two interlaced sub-fields are separately transformed and the second series also starts with a dc coefficient. As a result, the coefficients are transmitted as much as possible in their order of significance. This particularly produces the largest possible clusters of zero value coefficients. Such clusters are transmitted as one compact runlength code so that an effective bit rate reduction is achieved, also for moving pictures.

3 Claims, 8 Drawing Sheets

| y(0,0) | y(0,1) | y(0,2) | y(0,3) | y(0,4) | y(0,5) | y(0,6) | y(0,7) |
|--------|--------|--------|--------|--------|--------|--------|--------|
| y(1,0) | y(1,1) | y(1,2) | y(1,3) | y(1,4) | y(1,5) | y(1,6) | y(1,7) |
| y(2,0) | y(2,1) | y(2,2) | y(2,3) | y(2,4) | y(2,5) | y(2,6) | y(2,7) |
| y(3,0) | y(3,1) | y(3,2) | y(3,3) | y(3,4) | y(3,5) | y(3,6) | y(3,7) |
| y(4,0) | y(4,1) | y(4,2) | y(4,3) | y(4,4) | y(4,5) | y(4,6) | y(4,7) |
| y(5,0) | y(5,1) | y(5,2) | y(5,3) | y(5,4) | y(5,5) | y(5,6) | y(5,7) |
| y(6,0) | y(6,1) | y(6,2) | y(6,3) | y(6,4) | y(6,5) | y(6,6) | y(6,7) |
| y(7,0) | y(7,1) | y(7,2) | y(7,3) | y(7,4) | y(7,5) | y(7,6) | y(7,7) |

MD = 1

| $y_O(0,0)$ | $y_O(0,1)$ | $y_O(0,2)$ | $y_O(0,3)$ | $y_O(0,4)$ | $y_O(0,5)$ | $y_O(0,6)$ | $y_O(0,7)$ |
|---|---|---|---|---|---|---|---|
| $y_O(1,0)$ | $y_O(1,1)$ | $y_O(1,2)$ | $y_O(1,3)$ | $y_O(1,4)$ | $y_O(1,5)$ | $y_O(1,6)$ | $y_O(1,7)$ |
| $y_O(2,0)$ | $y_O(2,1)$ | $y_O(2,2)$ | $y_O(2,3)$ | $y_O(2,4)$ | $y_O(2,5)$ | $y_O(2,6)$ | $y_O(2,7)$ |
| $y_O(3,0)$ | $y_O(3,1)$ | $y_O(3,2)$ | $y_O(3,3)$ | $y_O(3,4)$ | $y_O(3,5)$ | $y_O(3,6)$ | $y_O(3,7)$ |
| $y_E(0,0)$ | $y_E(0,1)$ | $y_E(0,2)$ | $y_E(0,3)$ | $y_E(0,4)$ | $y_E(0,5)$ | $y_E(0,6)$ | $y_E(0,7)$ |
| $y_E(1,0)$ | $y_E(1,1)$ | $y_E(1,2)$ | $y_E(1,3)$ | $y_E(1,4)$ | $y_E(1,5)$ | $y_E(1,6)$ | $y_E(1,7)$ |
| $y_E(2,0)$ | $y_E(2,1)$ | $y_E(2,2)$ | $y_E(2,3)$ | $y_E(2,4)$ | $y_E(2,5)$ | $y_E(2,6)$ | $y_E(2,7)$ |
| $y_E(3,0)$ | $y_E(3,1)$ | $y_E(3,2)$ | $y_E(3,3)$ | $y_E(3,4)$ | $y_E(3,5)$ | $y_E(3,6)$ | $y_E(3,7)$ |

(Rows 1–4: I; Rows 5–8: II)

ENCODING CIRCUIT FOR TRANSFORM CODING OF A PICTURE SIGNAL AND DECODING CIRCUIT FOR DECODING SAID SIGNAL

CROSS-REFERENCE TO RELATED APPLICATIONS

This is a continuation of U.S. patent application Ser. No. 08/299,026, filed Aug. 31, 1994 abandoned; which is a continuation of U.S. patent application Ser. No. 08/171,377, filed Dec. 21, 1993 (now abandoned); which was a continuation of U.S. patent application Ser. No. 07/831,597, filed Feb. 5, 1992 (now abandoned).

BACKGROUND OF THE INVENTION

1. Field of the Invention

The invention relates to an encoding circuit for transform coding of a picture signal. The invention also relates to a decoding circuit for decoding an encoded signal supplied by the encoding circuit.

An encoding and a decoding circuit of this type may form part of a television broadcasting system, in which case the encoding system forms part of a television transmitter and each television receiver is provided with a decoding circuit. The encoding and decoding circuits may also form part of a video recorder.

2. Description of the Related Art

As is generally knows, a television picture may be assumed to be a two-dimensional array of pixels. In a 625-line television system, the picture comprises 576 visible picture lines, and each picture line comprises 720 visible pixels. The television picture thus comprises 576*720 pixels. If the luminance of each pixel is represented by, for example, 8 bits, the transmission of 25 pictures per second requires a bit-rate of approximately 83 Mbit/sec for the luminance information only. This is found to be inadmissibly high in practice.

By subjecting each picture to a two-dimensional transform, the number of bits per picture, and hence, the bit-rate can be limited considerably. To perform such a transform, the picture is partitioned into sub-pictures of N*N pixels each, for example, into 72*90=6480 sub-pictures of 8*8 pixels each. Each sub-picture is subsequently converted into a coefficient block of N*N coefficients by two-dimensional transform. The transform is intended to obtain a block of coefficients which are mutually uncorrelated. Among the known transform methods, the discrete cosine transform (DCT) is generally considered to be the best alternative.

The following is a representation providing insight into the two-dimensional transform. Associated with the chosen transform is a collection of N2 mutually orthogonal basic pictures B(i,k) with i,k=0, 1, 2, ... N, each comprising N*N pixels. Of these basic pictures, B(0,0) has a uniform luminance. As the index k increases, the basic picture B(i,k) has higher spatial frequencies in the horizontal direction, hence more detail. As the index i increases, the basic picture has higher spatial frequencies in the vertical direction. In the two-dimensional transform, each sub-picture is considered as the weighted sum of said basic pictures B(i,k) each with its own weighting factor y(i,k) i,k=0, 1, 2, . . . N. The weighting factors y(i,k) correspond to the previously-mentioned coefficients. It is these coefficients which are transmitted instead of the original pixels.

A reduction of the number of bits to be transmitted per picture is now achieved by transmitting only those coefficients which have a significant value. For example, the coefficient y(0,0), being the weighting factor of the basic picture B(0,0) and thus a measure of the average luminance of the sub-picture, is always transmitted. This coefficient y(0,0) is also referred to as "dc coefficient". The other coefficients, referred to as "ac coefficients", are only transmitted when their absolute value is larger than a predetermined threshold value. This is referred to as threshold coding. The coefficients may also be subjected to a coarser quantization as the corresponding basic picture comprises more details. This is because the human eye cannot observe fine details very well. The latter is also referred to as frequency-dependent quantization. In practice, frequency-dependent quantization and threshold coding are often combined. Then, only those coefficients are transmitted which still have a value which is unequal to zero after quantization.

The transmission of only those coefficients having a value which is unequal to zero implies that the address of the location of these coefficients in the two-dimensional coefficient block should also be transmitted. In practice, the coefficient block is read in a predetermined sequence for this purpose so that, for each coefficient block, a series of coefficients is produced in which said address is represented by a scanning sequential number. Reference 1 describes a method of scanning the coefficient block in accordance with a zigzag pattern, starting with the do coefficient y(0,0). Generally, the largest part of the signal energy in a sub-picture is concentrated in the low spatial frequencies. The significant coefficients are therefore often the coefficients y(i,k) with a small value for i and k. In the known zigzag scanning method, the significant coefficients acquire low scanning sequential numbers, the zero value coefficients are clustered for the greater part, and acquire high scanning sequential numbers. Such a series of coefficients can be transmitted efficiently.

However, the zigzag scanning pattern is not efficient for moving pictures. In fact, when there is motion within a Sub-picture, the value of the coefficients representing high spatial frequencies in the vertical direction increases drastically. These are the coefficients y(i,k) having a large value for i. The vertical scanning shown in FIG. 1c of Reference 1 has now proven to be more efficient.

SUMMARY OF THE INVENTION

It is an object of the invention to provide an encoding circuit with which an even further bit rate reduction is achieved.

According to the invention, the scanning pattern provides at least one jump to a predetermined coefficient which is not contiguous to a previously read coefficient.

The invention is based on the recognition that a block of coefficients is transmitted most efficiently if the coefficients are less significant as their scanning sequential nether is higher. It is achieved, with the encoding circuit according to the invention, that the predetermined coefficient, for example, y(7,0) which is representative of the motion in the sub-picture, is read earlier than the coefficients contiguous to this coefficient and is thus transmitted earlier than is the case with the known scanning patterns. As a result, the Coefficients are transmitted as much as possible in the order of their significance. More particularly, fewer and longer sub-series of zero value coefficients are then produced, which contributes considerably to the coding efficiency. As is indicated in Reference 2, one compact run-length code is assigned to sub-series of zero value coefficients. These sub-series further occur with greater probability at the end of the scanning process. In that case, it is even unnecessary to transmit said run-length code, but a code indicating the end of the block is then sufficient.

A favorable embodiment of the encoding circuit in which the sub-picture comprises two interlaced sub-fields, is characterized in that the transform circuit is adapted to partition each coefficient block into sub-blocks by separately transforming the sub-fields, and in that the predetermined coefficient forms part of a different sub-block than the previously read coefficients. It is thereby achieved that only one series of coefficients is obtained for each sub-picture, and that in said series, the lowest scanning sequential numbers are assigned to the most significant coefficients. It is to be noted that it is known per se from Reference 3, that two interlaced sub-fields are separately transformed into sub-blocks in the case of motion. However, in this known encoding circuit, each sub-block is transmitted separately. Since the total number of sub-blocks per picture is dependent on the amount of motion in the picture, and is thus variable, the number of transmitted coefficient series is also motion-dependent. This is found to have detrimental effects, in practice. Inter alia, each series of coefficients is terminated by a multi-bit "end-of-block" code, which, in the case of much motion, hence many series, is at the expense of the coding efficiency. In the encoding circuit according to the invention, the total number of series per picture remains constant.

REFERENCES

1. Variable control method for dcT coding using motion-compensated prediction. Lecture at the General National Meeting of the Institute of Television Engineers of Japan, 1986.
2. Verfahren und Schaltungsaordnung zur Bitratenreduktion. European Patent Application EP 0 260 748 A2, corresponding to U.S. Pat. No. 4,901,075.
3. Television system in which digitized picture signals subjected to a transform coding are transmitted from an encoding station to a decoding station. European Patent Application EP 0 282 135 A1, corresponding to U.S. Pat. No. 41849,812.

DESCRIPTION OF THE PREFERRED EMBODIMENTS

Figure 1:
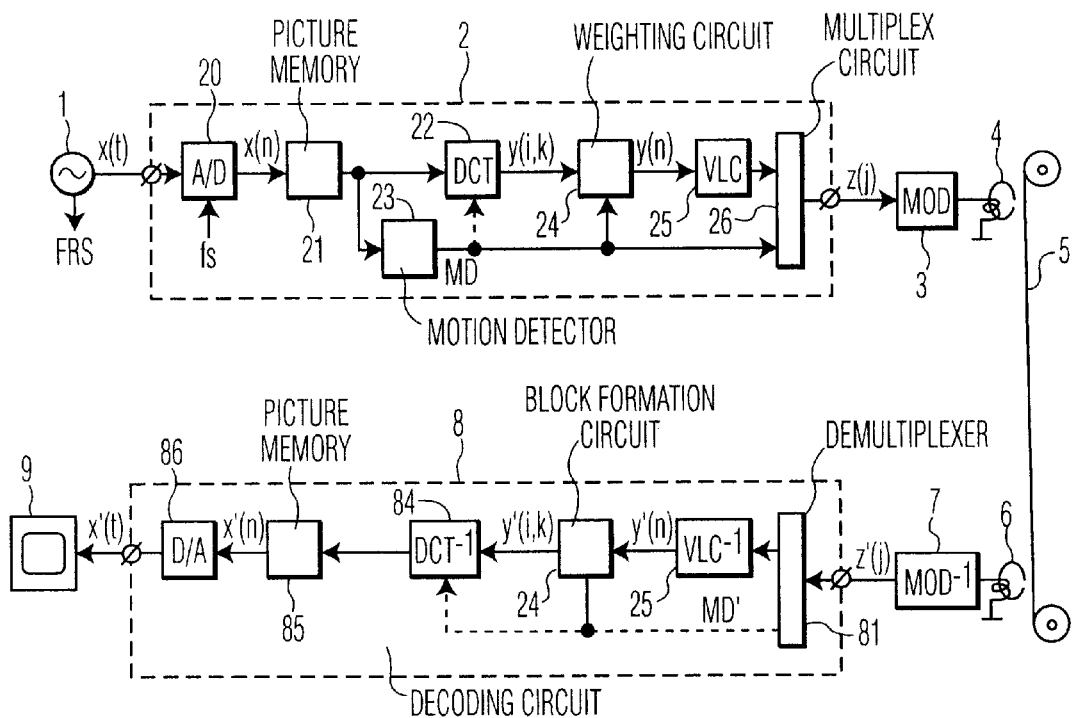
FIG. 1 shows, diagrammatically, a video recorder comprising an encoding circuit and a decoding circuit according to the invention.

FIG. 1 shows, diagrammatically, a video recorder comprising an encoding circuit 2 and a decoding circuit 8 according to the invention. The video recorder receives a picture signal x(t) from a picture signal source 1. The picture signal x(t) is applied to the encoding circuit 2. This circuit encodes the picture signal x(t) into a pulse series z(j) and applies this series via a modulator 3 to a write head 4 which writes the pulse series onto a magnetic tape 5. A read head 6 reads the recorded pulse series Z' (j) from the magnetic tape 5 and applies the recorded pulse series Z' (j) to a decoding circuit 8 via a demodulator 7. This decoding circuit decodes the pulse series Z' (j) and supplies an analog picture signal X' (t) which is applied to a monitor 9.

It the encoding circuit 2, the analog picture signal x(t) is sampled in an A/D converter 20 at a sampling frequency fs of, for Purple, 13.5 MHz, and is converted into 8-bit pixels x(n). These pixels are applied to a picture memory 21. The pixels are read from this picture memory in the form of sub-pictures of, for example, 8*8 pixels and applied to a transform circuit 22, as well as to a motion detector 23 which generates a motion signal MD. Motion detector 23 is known per se and may be constructed in a way as described in Reference 3. The transform circuit 22 subjects the sub-pictures to a discrete cosine transform and generates a coefficient block of 8*8 coefficients y(i,k) for each sub-picture. Embodiments of this transform circuit 22 will be described hereinafter. At this state of the description it is to be noted that the transform circuit may operate in a motion-adaptive manner. In that case, the transform circuit receives the motion signal MD, which is indicated by means of broken lines in FIG. 1. Each coefficient block y(i,k) from the transform Circuit 22 is subsequently applied to a scanning and weighting circuit 24, which also receives the motion signal ND. The scanning and weighting circuit, which will be described hereinafter, supplies, for each coefficient block, a series of coefficients y(n) to a variable-length encoding circuit 25. This circuit 25 is known per se and is constructed, for example, in a way as described in Reference 2. Circuit 25 encodes each series of coefficients y(n) into code series of variable length which comprise a considerably smaller number of bits than the corresponding coefficient block of 8*8 coefficients y(i,k). The code series and the motion signal MD may be applied to the magnetic tape either individually or in a time-division multiplex format. In the latter case, a multiplex circuit 26, which may be constructed in the conventional manner, is necessary.

The reverse operations are performed in the decoding circuit 8, In a demultiplexers 81, the code series and the motion signal MD' are regained from the recorded pulse series z' (j). The code series are applied to a variable-length decoding circuit 82 for reconstructing the series of coefficients y' (n). A block formation circuit 83 receives the series as well as the motion signal MD' from which it composes received coefficient blocks of 8*8 coefficients y' (i,k). In their turn, these received coefficient blocks are applied to an inverse transform circuit 84 so that each received coefficient block is transformed back into a sub-picture of 8*8 pixels. These sub-pictures are stored in a picture memory 85. The pixels in the picture memory jointly constitute a complete picture and are converted into a displayable analog picture signal x' (t) by a D/A converter 86.

Figure 2:
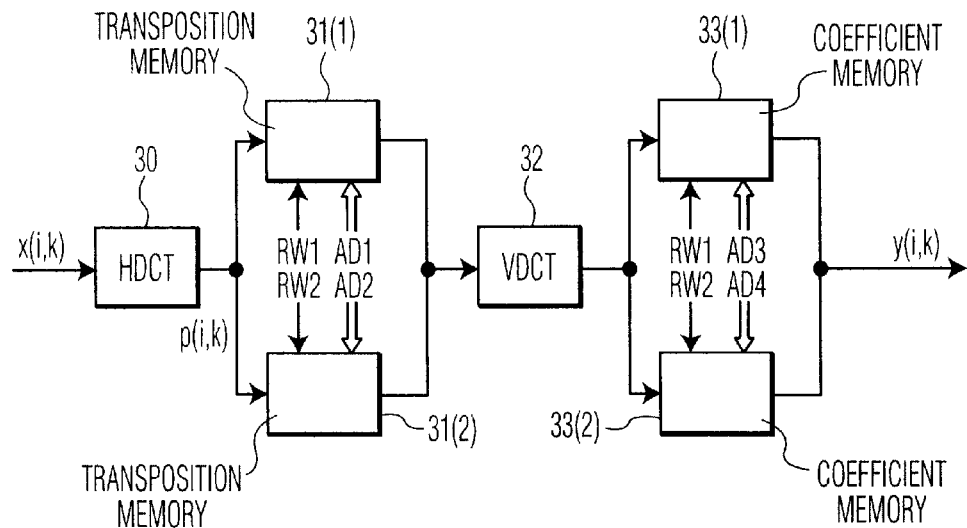
FIG. 2 shows an embodiment of a transform circuit shown in FIG. 1.

An embodiment of the transform circuit 22 is shown in FIG. 2. The transform circuit receives sub-pictures of 8*8 pixels. A sub-picture in matrix notation will hereinafter be denoted by X and its pixels will be denoted by x(i,k), The pixels x(i,k) are applied, row-by-row, to a 1-dimensional transformer 30 in which each row is subjected to a horizontal discrete cosine transform (HdcT) by multiplication by an 8*8 transform matrix A. The product matrix P obtained therefrom comprises 8*8 elements p(i,k). These elements p(i,k) are written, row-by-row, into a transposition memory 31(.). Transposition memory 31(.) has a double construction so that, during writing of the product matrix, it is possible to read the product matrix of the previous sub-picture. The elements p(i,k) are read, column-by-column, from the transposition memory 31(.) so that the product matrix p is transposed. The transposed product matrix PT is applied to a further 1-dimensional transformer 32 in which the columns are subjected to a vertical discrete cosine transform (vdcT) by multiplying it again by the transform matrix A. The matrix Y now obtained comprises 8*8 coefficients y(i,k). These coefficients are written, row-by-row, into a coefficient memory 33(.) which also has a double construction. Said matrix Y will hereinafter be referred to as a coefficient block. The coefficient memory 33(.) thus comprises a coefficient block of 8*8 coefficients for each sub-picture of 8*8 pixels.

Figure 3:
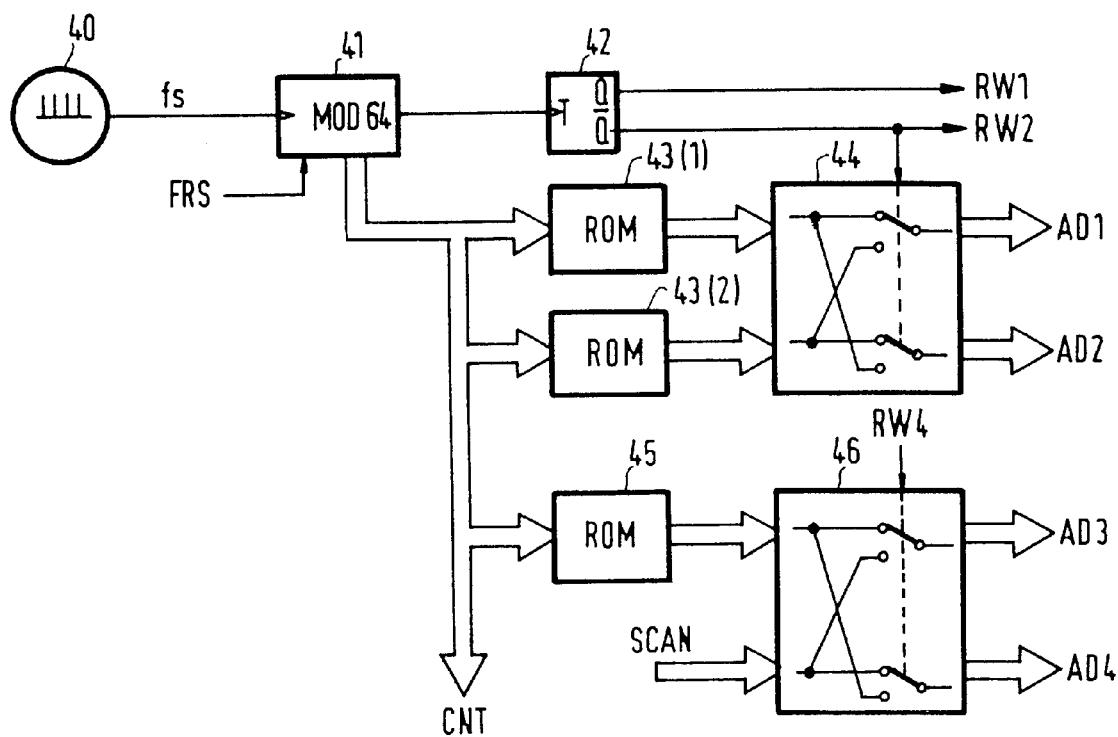
FIG. 3 shows a control circuit for controlling the transform circuit of FIG. 2.

To control the transform circuit shown in FIG. 2, a control circuit is provided which is shown in FIG. 3. The control circuit comprises a clock pulse generator 40 which applies clock pulses at the sampling frequency fs to a modulo-64 counter 41. At the start of each picture, this counter is reset by frame reset pulses FRS supplied by the picture signal source I (see FIG. 1). The modulo-64 counter generates 64 successive counts CNT for each sub-picture of 8*8 pixels. These counts are applied to the address inputs of two ROMS 43(1) and 43(2) which, in turn, generate addresses which are applied to the transposition memory 31(.) via a double multiplexer 44. More particularly, ROM 43(1) generates write addresses which determine the order in which the product elements p(i,k) of transformer 30 are written in the transposition memory 31(.). ROM 43(2) generates read addresses which determine the order in which the elements p(i,k) are read from the memory 31(.) and applied to a transformer 32. The double multiplexer 44 is controlled by an output of a toggle flip-flop 42 which receives a clock pulse from the Modulo-64 counter 41 at the start of each sub-picture. Consequently, new elements p(i,k) are written in the one memory 31(.), which is alternated by reading previously stored elements p(i,k) from the other memory 31(.).

The counts CNT of the modulo-64 counter 41 are also applied to the address inputs of a ROM 45. This ROM generates the write addresses which determine the sequence at which toe coefficients y(i,k), generated by transformer 32, are written in the coefficient memory 33(.). The scanning and weighting circuit 24 (see FIG. 1) to be described hereinafter supplies the read addresses which determine the scanning order in which the coefficients are read from this memory. These read addresses, which are denoted by SCAN in FIG. 3, and said write addresses are applied to the coefficient memory 33(.) via a double multiplexer 46. The double multiplexer 46 is controlled by the previously mentioned output of toggle flip-flop 42.

Figure 4:
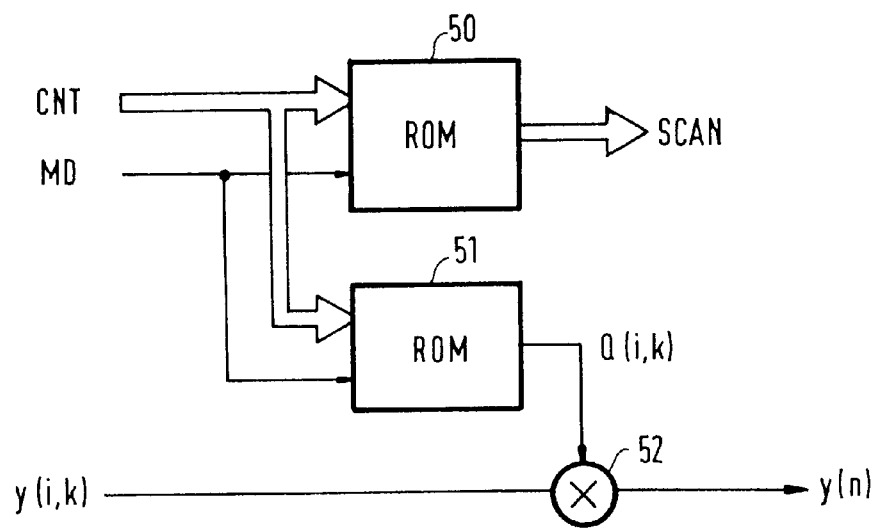
FIG. 4 shows an embodiment of a scanning and weighting circuit shown in FIG. 1.

FIG. 4 shows an embodiment of the scanning and weighting circuit 24. The circuit comprises two RON 50 and 51 to which the count CNT of the modulo-64 counter 41 (FIG. 2) is applied. Moreover, the motion signal MD, which is generated by the motion detector 23 (FIG. 1), is applied to these ROMS. The motion signal MD has the logic value "1" during a sub-picture when the motion detector has detected a noticeable quantity of motion within the sub-picture.

Figures 5, 6:
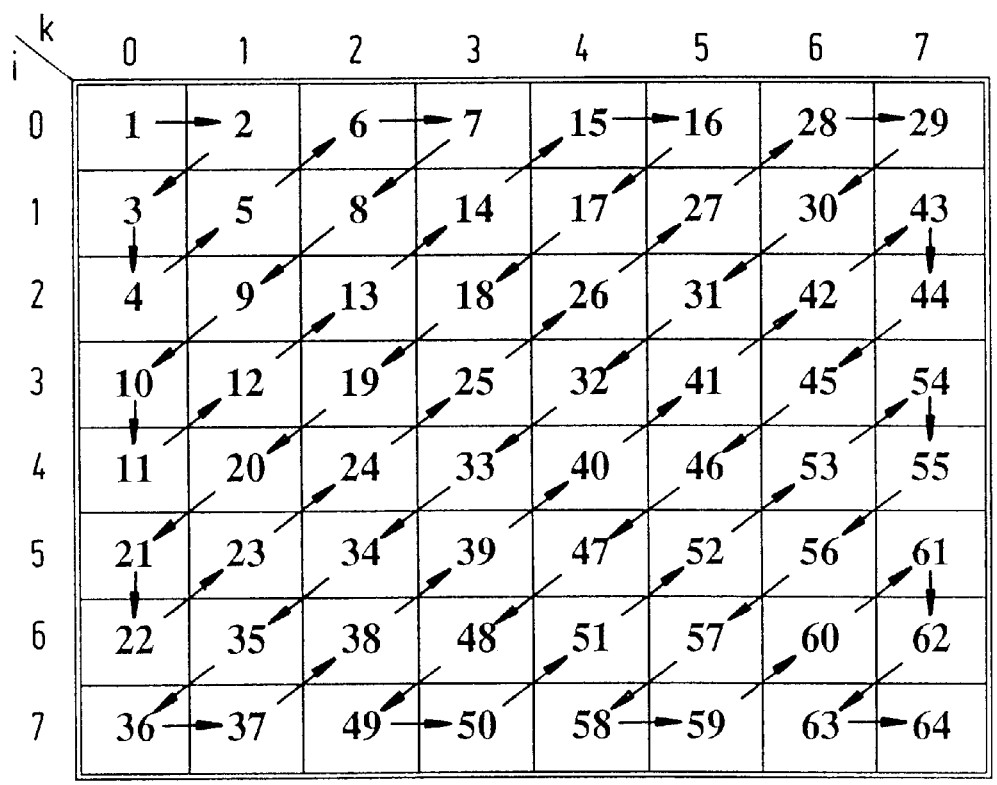
FIG. 5 shows the contents of a coefficient memory shown in FIG. 2.
FIGS. 6 and 7 show examples of the scanning order in which the coefficient memory of FIG. 2 is being read.

ROM 50 generates the previously-mentioned read address SCAN which is applied to the coefficient memory 33(.) (FIG. 2). A is shown in FIG. 5, the coefficient memory comprises 64 coefficients y(i,k); i,k=0, 1, 2 . . . 7. The read address SCAN now determines which coefficient y(i,k) is read from this memory. FIG. 6 shows, for each index (i,k), at which count CNT the coefficient y(i,k) is read in the event that the motion signal MD="0". It has been assumed that the count CBT successively assumes the values 1, 2, . . . 64. The count CNT will hereinafter be referred to as the scanning sequential number. It is apparent from FIG. 6 that the coefficient memory is scanned in accordance with a zigzag pattern. Such a scanning pattern is commonly used in picture transform. As already stated in the opening paragraph, such a scanning method provides a maximal clustering of the zero value coefficients which thereby acquire high scanning sequential numbers.

Figure 7:
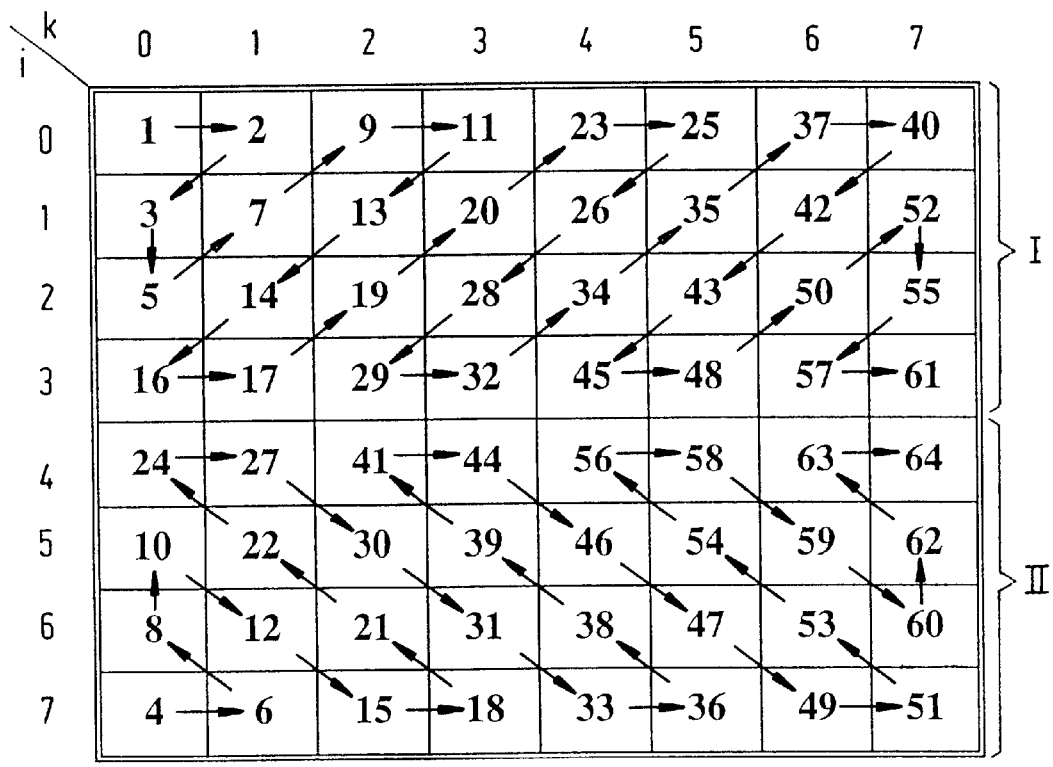

When a noticeable amount of motion has been detected within a sub-picture, the motion signal MD applied to ROM 50 has the logic value "1". FIG. 7 shows, for each index (i,k), at which count CNT the coefficient y(i,k) is read in the case of motion. In this embodiment, the scanning pattern starts with the dc coefficient y(0,0) and some contiguous coefficients. Subsequently, there is a jump to the coefficient y(7,0) which has a significant value in the case of motion. As is apparent from FIG. 7, the serial sequence of coefficients obtained by this scanning pattern comprises, as it were, two interleaved sub-series denoted by I and II in the Figure. Sub-series I comprises the coefficients of a part of the coefficient block which is substantially not influenced by the motion and which is scanned in accordance with the zigzag pattern which is efficient of itself, Sub-series II comprises the coefficients which are representative of the motion, The Sub-series are interleaved in such a way that the largest possible clusters of zero value coefficients are produced in the serial Sequence.

Figure 8:
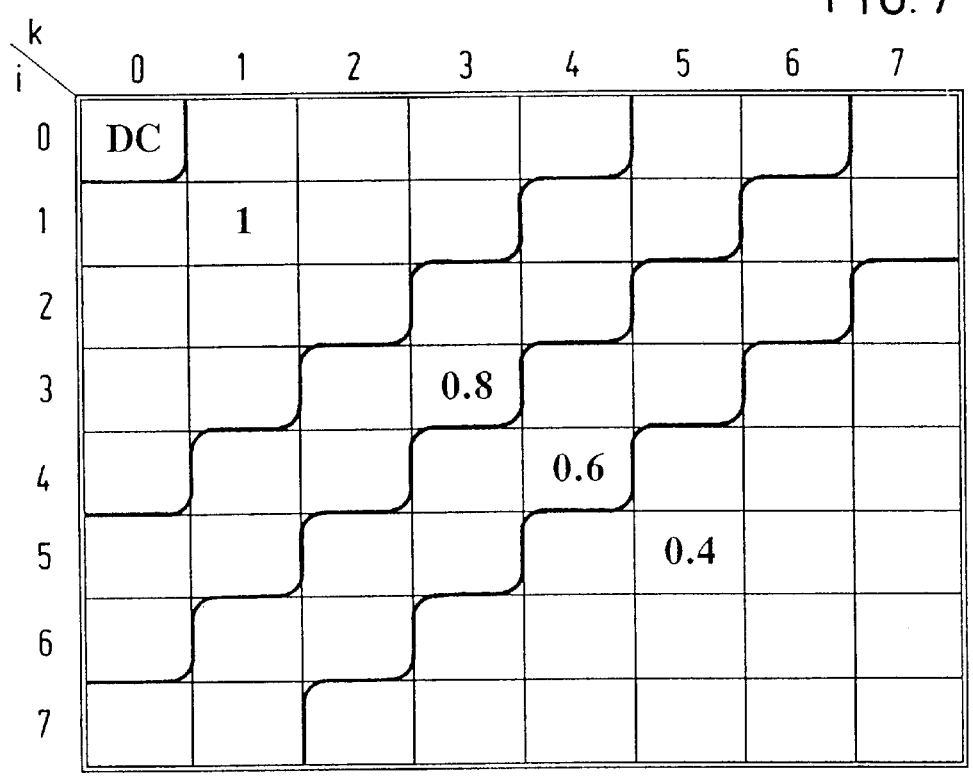
FIGS. 8 and 9 show examples of weighting factors for use in the scanning and weighting circuit of FIG. 4.
Figure 9:
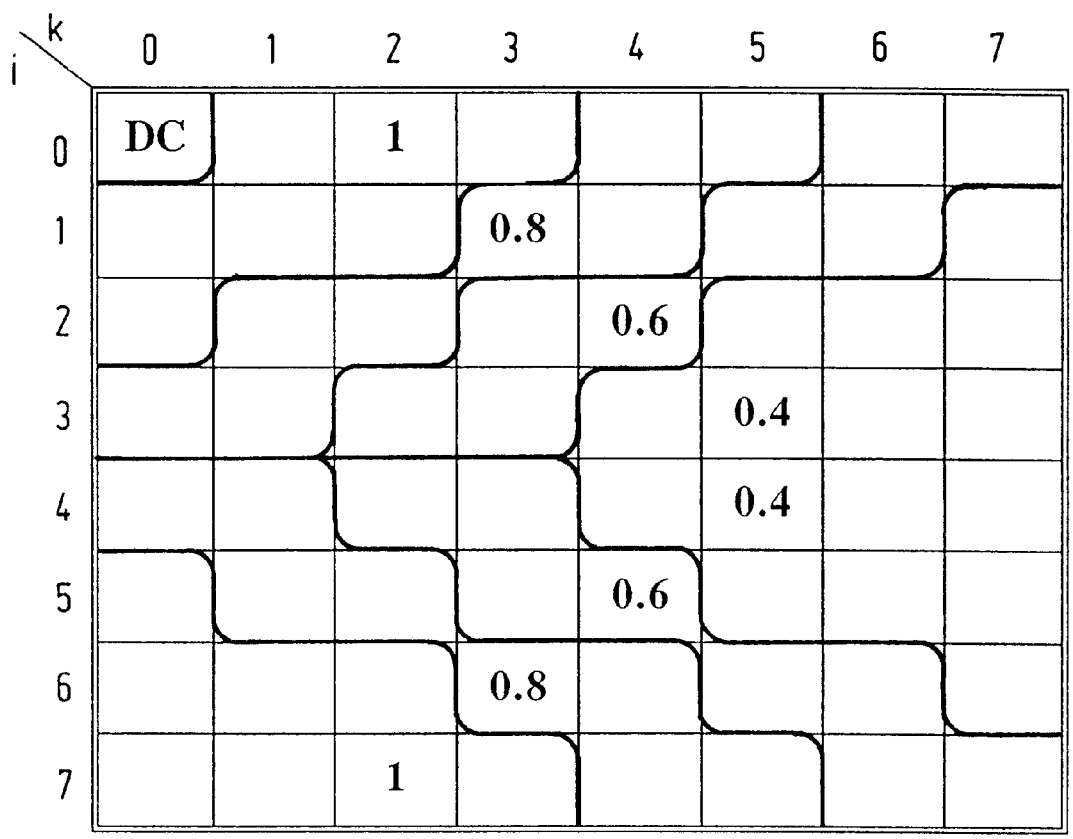

During signal processing after the transform, the dc coefficient is often processed separately and with a greater precision than the other coefficients. The ac coefficients are subjected to a coarser quantization, as they represent more spatial detail in the sub-picture. Such a frequency-dependent quantization is achieved, for example, by multiplying each ac coefficient y(i,k) by a weighting factor Q(i,k). As is shown in FIG. 4, the count CNT of the modulo-64 counter 41 (FIG. 2) is also applied to ROM 51. For each count, this ROM 51 generates the weighting factor Q(i,k) and applies it to a multiplier 52 for multiplying the weighting factor by the corresponding coefficient y(i,k). FIG. 8 shows an example of the weighting factors Q(i,k). It is apparent from FIG. 8 that a first group of ac coefficients is multiplied by the weighting factor 1, a second group is multiplied by the weighting factor 0.8, a third group is multiplied by the weighting factor 0.6 and a fourth group is multiplied by the weighting factor 0.4. The motion signal MD is applied to the ROM 51 in order to render the weighting of coefficients motion-adaptive. FIG. 9 shows an example of the weighting factors Q(i,k) in the case where the motion signal MD="1". Coefficient y(7,0) and the ac coefficients in its immediate proximity, which represent the motion information, are now quantized more accurately than in the absence of motion. This considerably contributes to the picture quality.

Figures 10, 11:
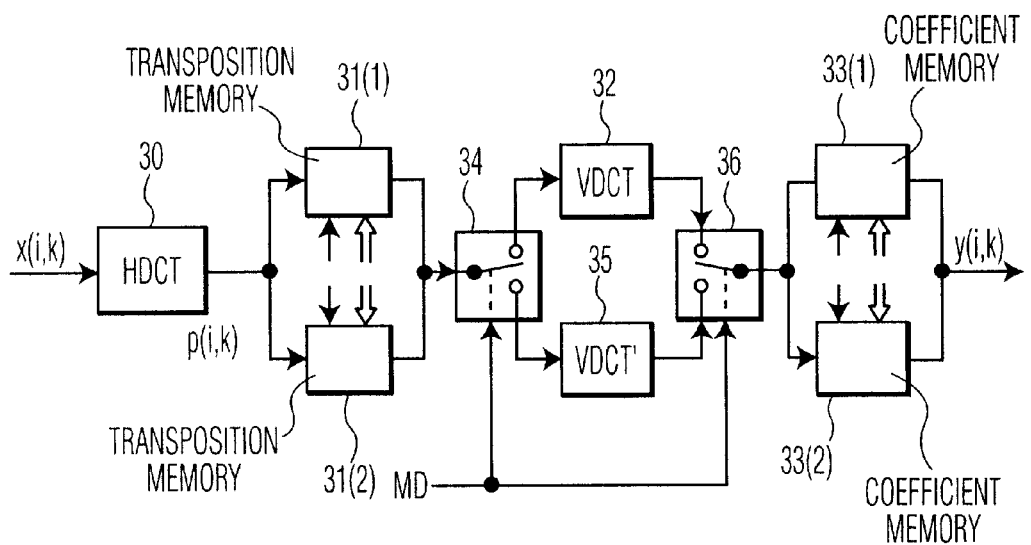
FIG. 10 shows a further embodiment of the transform circuit of FIG. 1.
FIG. 11 shows the contents of a coefficient memory shown in FIG. 10.

FIG. 10 shows a further embodiment of the transform circuit 22 of FIG. 1. This circuit is a motion-adaptive transform circuit which transforms a sub-picture of 8*8 pixels into one coefficient block of 8*8 coefficients if no motion has been detected in the sub-picture, and which transform the Sub-picture into two sub-blocks of 4*8 coefficients if motion has been detected. The transform circuit shown in FIG. 10 is different from the transform circuit shown in FIG. 2 in that it has two switches 34 and 36 and a further 1-dimensional transformer 35. Only the difference with the transform circuit shown in FIG. 2 will be described hereinafter. The motion-adaptive transform is further described extensively in Reference 3.

When the motion signal is MD="0", which means that no noticeable motion has been detected within a sub-picture, the switches 34 and 36 are in the position shown and the transform circuit operates in the manner described hereinbefore. one coefficient block of 8*8 coefficients as shown in FIG. 5 is then written in the coefficient memory 33(.).

However, if MD="1", the switches 34 and 36 are in the other position. In this state, the pixels p(i,k) are read in a different sequence from the transposition memory 31(.) than if MD="0". More particularly, the product matrix P in the transposition memory 31(.) is now divided into a first 4*8 matrix comprising the elements p(i,k) of the odd rows, and a second 4*8 matrix comprising the elements p(i,k) of the even rows. Said division is obtained by applying suitable read addresses from ROM 43(2) (see FIG. 3) to the transposition memory. The two 4*8 matrices are applied one after the other and column-by-column via the switch 34 to the transformer 35 in which they are subjected to a vertical discrete cosine transform (VdcT). In transformer 35, the columns are multiplied by a 4*4 transform matrix A'. As a result, two sub-blocks of 4*8 coefficients each are obtained. The first sub-block ("sub-block I") is obtained by discrete cosine transform of a sub-field of 4*8 pixels comprising the odd lines of the sub-picture X. This sub-field is further referred to as the odd sub-field. The second sub-block ("sub-block II") is obtained by transform of a sub-field comprising the even lines of the sub-picture x and will further be referred to as the even sub-field.

FIG. 11 indicates how the two sub-blocks are stored in the coefficient memory 33(.). The memory comprises sub-block I with coefficients $y_o(i,k)$ of the odd sub-field, and sub-block II with coefficients $y_E(i,k)$ of the even sub-field. Here, i=0, 1, ... 3 and k=0, 1, ... 7. The coefficients $y_o(0,0)$ and $y_E(0,0)$ now represent the average luminance of the odd and even sub-fields and are thus both dc coefficients. The other coefficients $y_o(0, 1) ... y_o(3,7)$ and $y_E(0,1) ... y_E(3,7)$ are ac coefficients.

Figure 12:
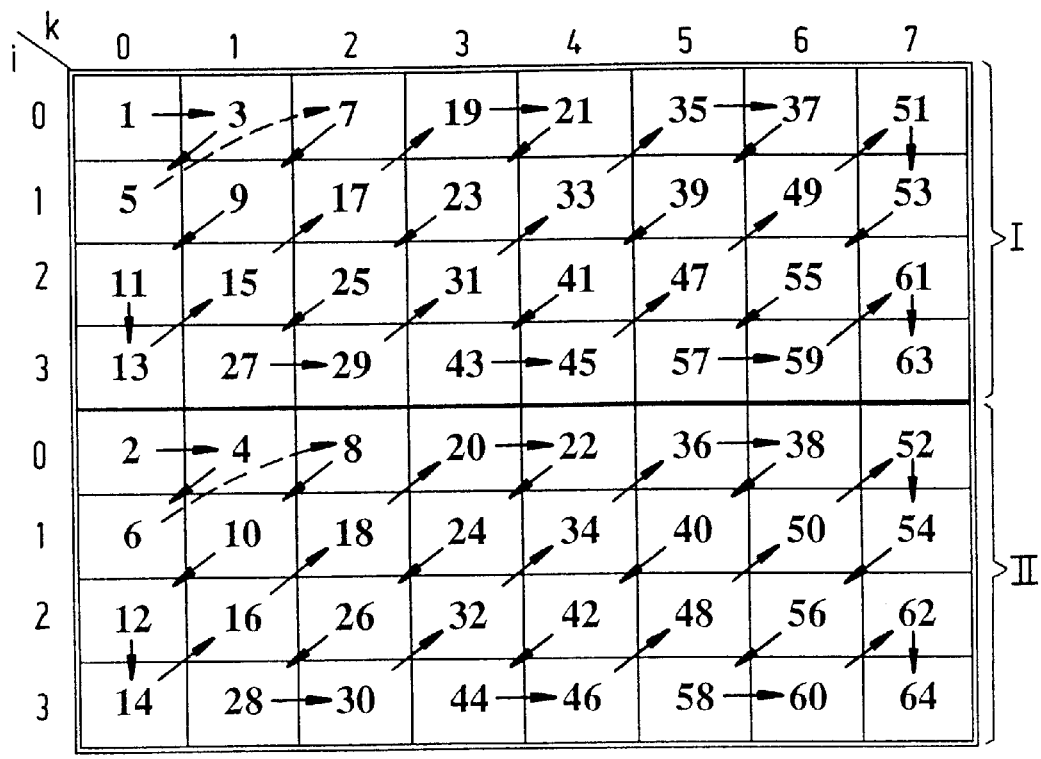
FIG. 12 shows an example of the scanning order in which the coefficient memory of FIG. 10 is being read.
Figure 13:
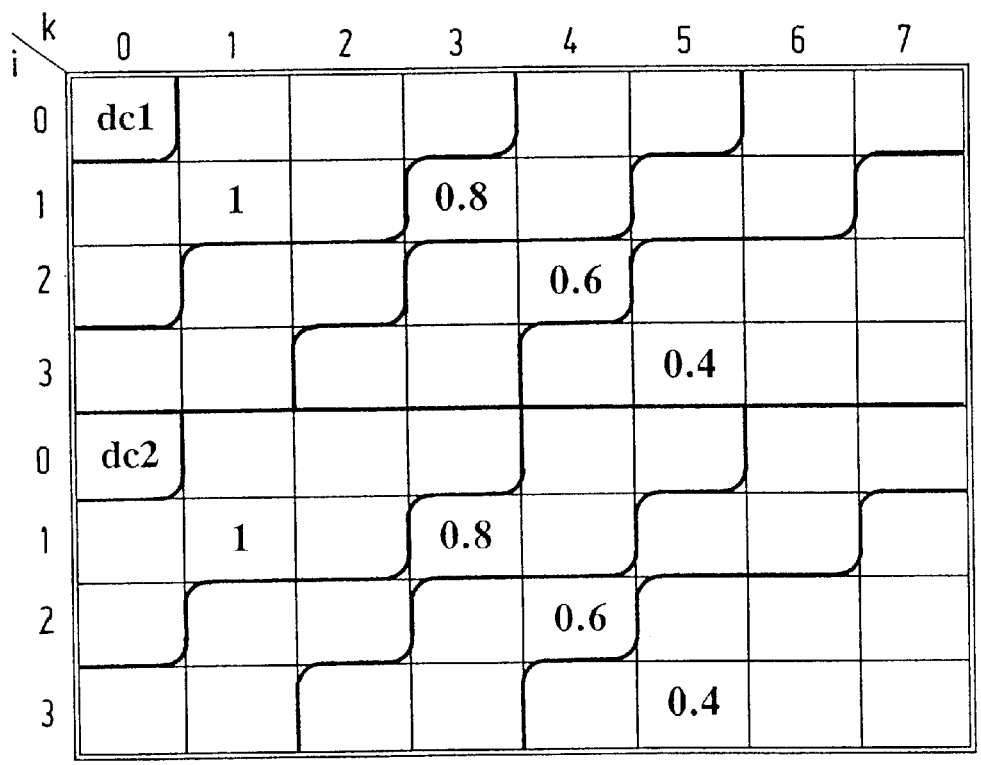
FIG. 13 shows a further example of weighting factors for use in the scanning and weighting circuit of FIG. 4.

FIG. 12 shows an example of a scanning pattern which is used in the transform circuit shown in FIG. 10. The dc coefficients $y_o(0,0)$ of sub-block I and $y_E(0,0)$ of sub-block II are immediately read one after the other. Both sub-blocks are scanned in accordance with the effective zigzag pattern, while, alternately, a coefficient of the one sub-block and the other sub-block is read. It is to be noted that the 4*8 su-blocks comprise more signal energy in the horizontal direction than in the vertical direction, It is, therefore, useful to accelerate the scanning in the horizontal direction to some extent. This is achieved by the broken line shown in the FIG. 12. The scanning sequence shown is fixed in the ROM 50 of the scanning and weighting circuit shown in FIG. 4. FIG. 13 shows an example of the weighting factors which correspond to this pattern and are fixed in ROM 51 (see also FIG. 4).

Figure 14:
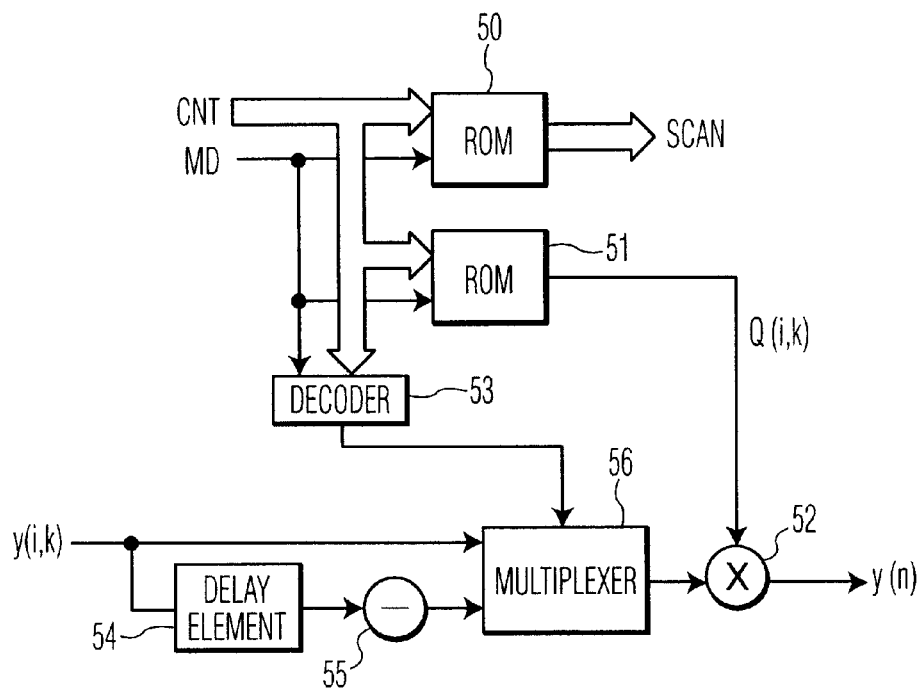
FIG. 14 shows a further embodiment of the scanning and weighting circuit of FIG. 1.

Use of the motion-adaptive transform circuit shown in FIG. 10 means that two dc coefficients must be processed separately for sub-pictures in which motion has been detected. In the case of non-moving sub-pictures, there is, however, only one do coefficient. It has been found useful to process a block of coefficients equally in both cases. FIG. 14 shows an embodiment of a scanning and weighting circuit which is suitable for this purpose. As compared with the circuit shown in FIG. 4, this scanning and weighting circuit additionally comprises a decoder 53, a delay element 54, a subtractor circuit 55 and a multiplexer 56. When the second dc coefficient $y_E(0,0)$ is being read from the coefficient memory, the delay element 54 still comprises the previously read first dc coefficient $y_o(0,0)$. The difference between the two is determined in the subtractor circuit 55 and applied as a difference coefficient $y_o(0,0)-y_E(0,0)$ to the multiplexer 56. The multiplexer is controlled by the decoder 53 in such a way that said difference coefficient, instead of the second dc coefficient $y_E(0,0)$, is processed. This difference coefficient is now further processed as a quasi ac coefficient. Since the difference coefficient is small in practice and is quantized accurately (weighting factor 1), the original second dc coefficient $Y_E(0,0)$ can be reconstructed with sufficient accuracy at the receiver end. It should be noted that it is also possible not to transmit the first dc coefficient $y_o(0,0)$ separately, but to transmit a quasi-dc coefficient instead, which represents the sum $y_o(0,0)+y_E(0,0)$. In that case, quantization errors are evenly distributed over the two de coefficients.

To regain the original pixels, the decoding circuit 8 (see FIG. 1) comprises a block formation circuit 83 and an inverse transform circuit 84. An embodiment of the inverse transform circuit is obtained by reversing the signal directions in the transform circuits of FIGS. 2 and 10 and by interchanging the read and write signals for the various memories.

Figure 15:
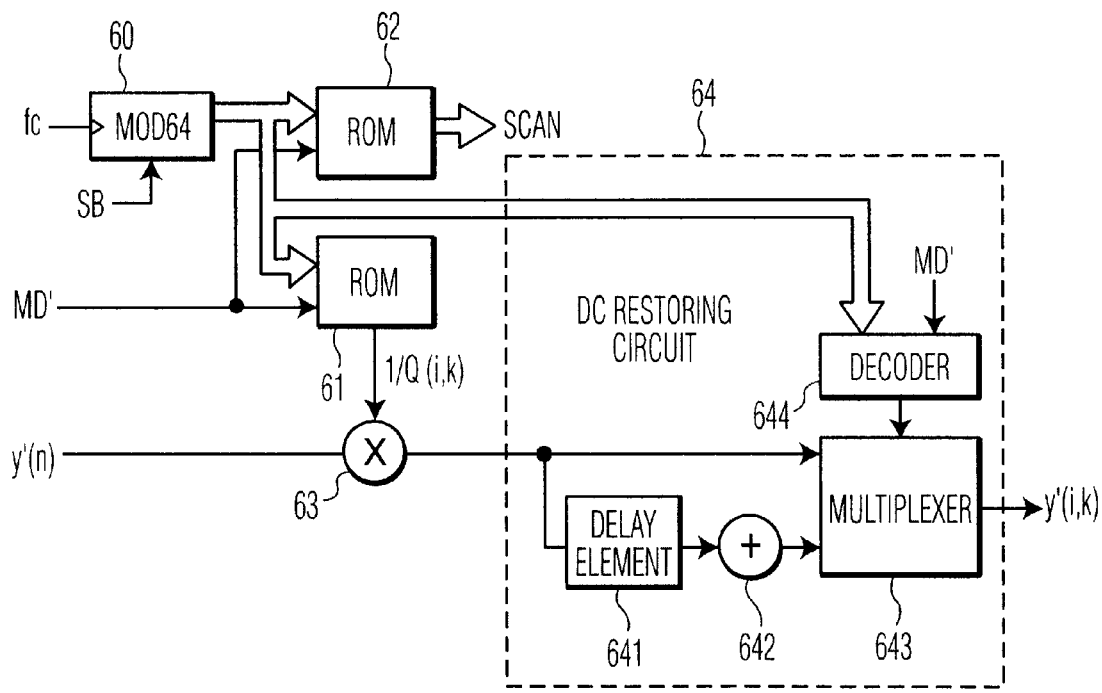
FIG. 15 Shows an embodiment of a block formation circuit shown in FIG. 1.

An embodiment of the block formation circuit is shown in FIG. 15. It comprises a counter 60 which receives a clock pulse fc for each received coefficient, and is reset at the first coefficient of each received coefficient block by a start block signal SB. The count of counter 60 is applied to a first ROM 61 which applies an inverse weighting factor 1/Q(i,k) to a multiplier 63 for each coefficient. The reconstructed coefficients y' (i,k) are now available at the output of the multiplier for storage in the coefficient memory of the inverse transform circuit. The memory is addressed by write addresses SCAN' which are stored in a second ROM 62 for each count.

FIG. 15 shows, by means of broken lines, a dc restoring circuit 64 for restoring the second dc coefficient of a block, which is necessary if the scanning and weighting circuit shown in FIG. 14 is used in the encoding circuit. The dc restoring circuit comprises a delay element 641, an adder 642, a multiplexer 643 and a decoder 644. When receiving the difference coefficient $y_o(0,0)-y_E(0,0)$, the delay element 641 still comprises the previously received first dc coefficient $y_o(0,0)$, So that adder 642 supplies the second dc coefficient $Y_E(0,0)$.

What is claimed is:

1. An encoding circuit for transform coding pictures of an interlaced video signal, said encoding Circuit comprising:
   (a) means for partitioning each of said pictures into a plurality of sub-pictures;
   (b) a motion detector for receiving each of said sub-pictures and for generating a motion signal when noticeable motion has been detected within a received sub-picture;
   (c) a transform circuit for transforming each of said sub-pictures into a two-dimensional coefficient block of coefficients if no motion has been detected within said sub-picture, and for transforming interlaced sub-fields constituting said sub-picture into respective sub-blocks of coefficients if motion has been detected within said sub-picture; and (d) scanning means for reading said coefficients of said block or sub-blocks in accordance with a predetermined scanning pattern, and for converting said coefficients into a sequence of coefficients, wherein, in response to said motion signal indicating no motion has been detected within a sub-picture, said scanning means provides each read coefficient contiguous to a previously read coefficient, and in response to said motion signal indicating motion has been detected within a sub-picture, said scanning means provides at least one jump to a predetermined coefficient of said block which is not contiguous to a previously read coefficient, said scanning means reading the coefficients of the sub-blocks alternately, and wherein, in response to said motion signal indicating noticeable motion having been detected within a sub-picture, said scanning means reads the coefficients of the block following the pattern depicted in FIG. 7 of the drawings.

2. The encoding circuit as claimed in claim 1 wherein said predetermined coefficient is representative of the presence of motion in said sub-picture.

3. The encoding circuit as claimed in claim 1 wherein said predetermined coefficient is a coefficient representing a high vertical frequency and a low horizontal frequency.

* * * * *